United States Patent Office 3,408,794
Patented Nov. 5, 1968

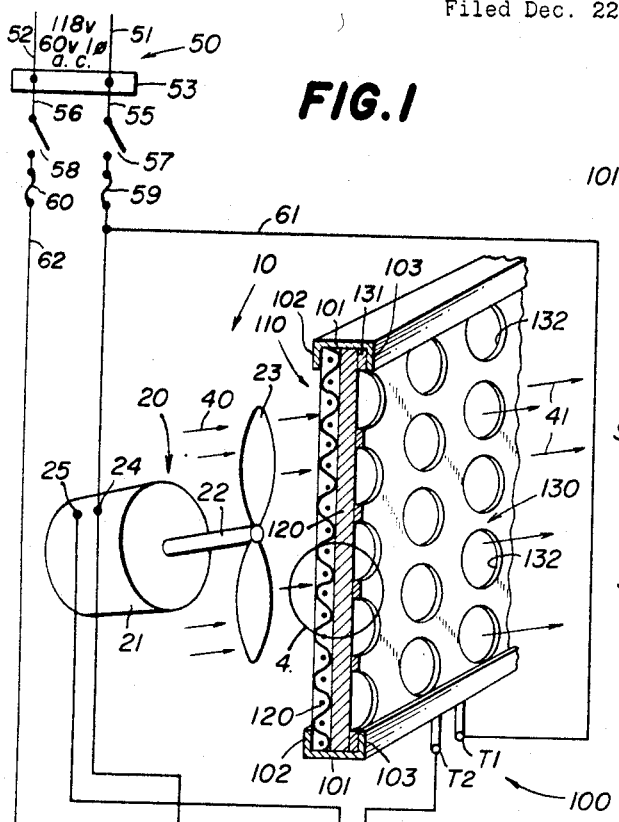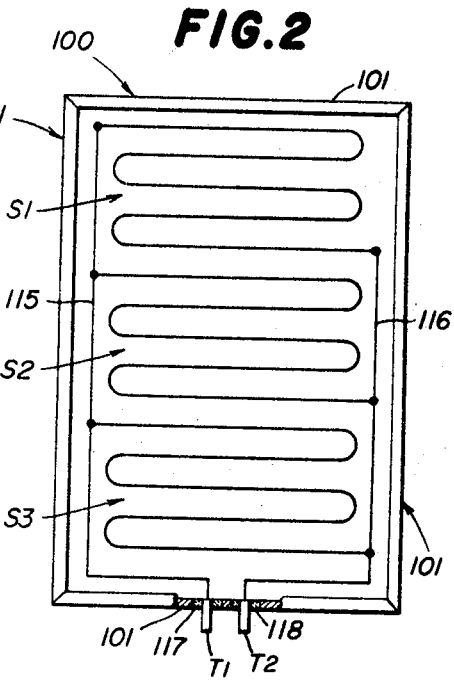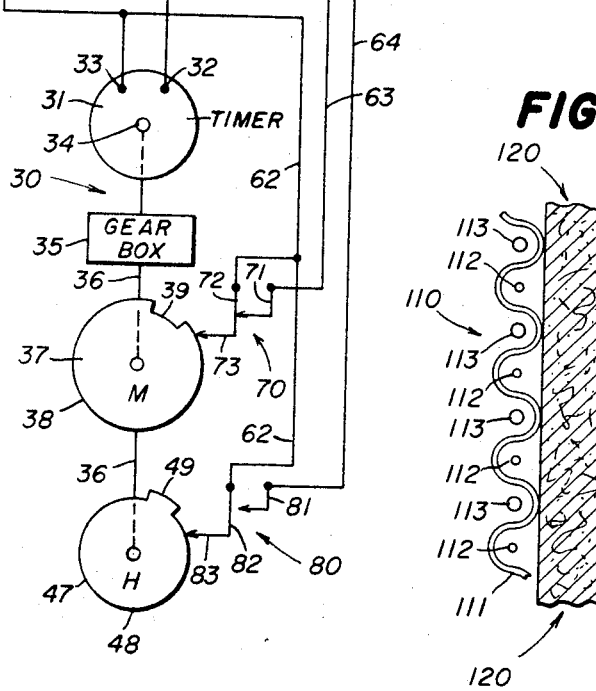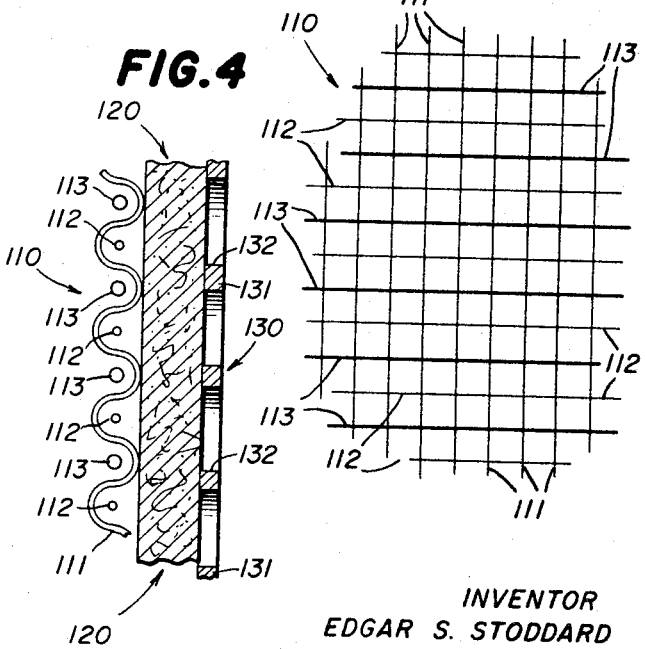
Nov. 5, 1968   E. S. STODDARD   3,408,794
FILTERING SYSTEM AND FILTER STRUCTURE
Filed Dec. 22, 1966
INVENTOR
EDGAR S. STODDARD
BY
Prangley, Baird, Clayton,
Miller & Vogel
ATTYS.

3,408,794
FILTERING SYSTEM AND FILTER STRUCTURE
Edgar S. Stoddard, 626 S. Columbia St.,
Naperville, Ill. 60540
Filed Dec. 22, 1966, Ser. No. 603,795
15 Claims. (Cl. 55—282)

ABSTRACT OF THE DISCLOSURE

A self-cleaning air filtering system including a porous filter member of glass fiber threads having disposed on one surface or woven therein an electrically resistive wire connectable to a source of electrical power, the wire being energized periodically to heat it to a temperature in the range from about 700° F. to about 1,000° F. to clean the filter member by heating to destruction the combustible materials entrapped on the filter member.

This invention relates to an improved system for filtering air and the like, and to a filter structure incorporated therein and forming a part thereof.

The present invention is useful in air filters such as those associated with heating systems, air conditioning systems, ventilating systems, and the like. Such air filters must be cleaned or replaced regularly in order to maintain the efficiency of the apparatus and systems with which or in which the filters are incorporated. The cleaning and replacement of such filters is often neglected because of the cost thereof, the difficulty thereof and the dirt and debris associated therewith which render the replacement and cleaning distasteful to the individual owner.

Accordingly, it is an important object of the present invention to provide a self-cleaning filter structure for filtering air or the like comprising a frame, a body of porous filter medium mounted on the frame and supported thereby, the filter medium being electrically insulating and chemically stable at temperatures up to about 1,000° F., an electric heating element including an electrically resistive wire in thermal contact with at least one surface of the body of filter medium, and a pair of terminals mounted on the frame and connected to the heating element for supplying electrical energy thereto, the heating element being heatable to a temperature in the range from about 700° F. to about 1,000° F. to clean the filter medium by heating to destruction the combustible materials entrapped thereon.

Another object of the invention is to provide a self-cleaning filter structure of the type set forth wherein the frame is formed of metal and the terminals are electrically insulated therefrom, the heating element is disposed on the upstream side of the filter structure and comprises a plurality of separate resistive wires connected in parallel, and the filter medium is glass fibers.

Another object of the invention is to provide a self-cleaning filter structure for filtering air and the like comprising a frame, a porous batt of glass fibers disposed in the frame, the glass fibers being both electrically insulating and chemically stable at temperatures up to about 1,000° F., a first porous retainer mounted on the frame on one side of the batt and being chemically stable at temperatures up to about 1,000° F., a second porous retainer mounted on the frame on the other side of the batt and cooperating with the first retainer to hold the batt in the operative position on the frame, the assembly of the batt of glass fibers and the retainers being porous to permit the passage of air therethrough while filtering entrained materials therefrom, the first retainer having incorporated therein a heating element formed of electrically resistive wire in good thermal contact with the adjacent surface of the batt of glass fibers, and a pair of electrical terminals mounted on the frame and connected to the ends of the resistive wire to provide connection to a source of electrical potential therefor, the heating element being heatable to a temperature in the range from about 700° F. to about 1,000° F. to clean the batt of glass fibers by heating to destruction the combustible materials entrapped thereon.

In connection with the foregoing object, another object of the invention is to provide a self-cleaning filter structure wherein the first porous retainer includes interwoven glass fiber threads and electrically resistive wire, the first retainer preferably being a woven cloth wherein the resistive wire is disposed in the warp of the cloth, the warp preferably being formed of alternate strands of resistive wire and glass fiber threads with the woof formed of glass fiber threads.

A further object of the invention is to provide a filter system comprising a self-cleaning structure of the type set forth together with means for passing air through the filter structure to remove from the air material entrained therein, and a control circuit for operating the air passing means and for applying electrical energy to the terminals, the control circuit applying electrical energy to the terminals only when the air passing means is not operating.

A still further object of the invention is to provide a filtering system of the type set forth wherein the electrical heating element is disposed on the upstream side of the filter structure, the air passing means is an electrically operated fan, and the control circuit includes a timer operative alternately to operate the air passing means and to supply electrical energy to the heating element.

Further features of the invention pertain to the particular arrangement of the parts of the filtering system and filter structure whereby the above-outlined and additional operating features thereof are attained.

The invention, both as to its organization and method of operation, together with further objects and advantages thereof, will best be understood by reference to the accompanying drawing, in which:

FIGURE 1 is a schematic and diagrammatic illustration of a filtering system incorporating a filter structure, the filter structure being shown partially in vertical section, all made in accordance with and embodying the principles of the present invention;

FIG. 2 is a plan view diagrammatically illustrating the disposition of the heating wires in the filter structure forming a part of the filtering system of FIG. 1, certain portions of the filter structure being broken away;

FIG. 3 is a greatly enlarged fragmentary view of the heatable filter member forming a part of the filter structure; and FIG. 4 is an enlarged view in vertical section of the portion of the filter structure within the circle designated 4 in FIG. 1.

Referring to FIG. 1 of the drawing, there is there illustrated a filtering system 10 made in accordance with and embodying the principles of the present invention, and more particularly including an improved filter structure 100 made in accordance with the present invention. It will be understood that the filtering system 10 may be associated with and form a part of a heating system, an air conditioning system, a ventilating system, and the like, but as illustrated it is associated with a ventilating system that includes a fan 20 controlled by a timer 30 which serves to draw air into a stream designated by the arrows 40 and is disposed on one side, i.e., the upstream side, of the filter structure 100 and blows the air through the filter structure 100 to provide a filtered stream 41 of air on the other side, i.e., the downstream side, of the filter structure 100.

The fan 20 more particularly includes an electric motor 21 having an output shaft 22 to which is connected the usual fan blade 23 suitable to create the stream 40 of unfiltered air. The motor 21 is provided with a pair of input terminals 24 and 25 to which there is applied at suitable time intervals operating potential for the motor 21 to cause operation of the fan 20. More specifically, the filter system 10 is powered from a conventional household electric supply in the form of a 118 volt, 60 cycle, single phase, A.C. supply 50 including a pair of input conductors 51 and 52 terminating at a terminal block 53 and connecting to a pair of main conductors 55 and 56, respectively. The conductors 55 and 56 are selectively connected by switches 57 and 58, respectively through fuses 59 and 60, respectively, to a pair of conductors 61 and 62, respectively. The conductor 61 is connected to the terminal 24 on the motor 20 and is also connected to one of the terminals of the filter structure 100 as will be described more fully hereinafter. The other conductor 62 is connected to one of the input terminals of the timer 30 and to switches 70 and 80, respectively.

The timer 30 more specifically includes an electrical motor 31 having a pair of input terminals 32 and 33 which are connected respectively to the conductors 61 and 62. An output shaft 34 is provided that is connected to the input of a gear box 35, the gear box 35 having an output shaft 36 carrying a pair of cams 37 and 47. The cam 37 has a raised cam surface 38 extending around the greater portion of the circumference thereof and a lower cam surface 39 having only a small arcuate extent. The cam 47 has a lower cam surface 48 extending around the major portion of the circumferences thereof and a raised cam surface 49 having only a small arcuate extent, the arcuate extent of the timer surfaces 38 and 48 preferably being substantially equal and likewise the arcuate extent of the cam surfaces 39 and 49 being substantially equal.

In the filtering system 10, the cam 37 controls the operation of the switch 70, the switch 70 including a pair of switch springs 71 and 72, the switch spring 72 having associated therewith a cam follower 73 in contact with the cam surfaces of the cam 37, whereby the position of the switch springs 71-72 is controlled by the cam 37. When the cam follower 73 is in contact with the cam surface 38, the switch springs 71 and 72 are closed, as illustrated in FIG. 1; and when the cam follower 73 is in contact with the cam surface 39, the switch springs 71-72 are open. The switch spring 72 is connected to the conductor 62 and the switch spring 71 is connected by a conductor 63 to the input terminal 25 of the fan motor 21, whereby when the switch 70 is closed and the switches 57-58 are closed, the fan motor 21 is energized and the fan 20 is operating; conversely, when the switch 70 is open, the fan motor 21 is de-energized and the fan 20 is not operating. It will be seen therefore that the cam 37 controls the operation of the fan 20, the fan 20 operating when the cam follower 73 is in contact with the cam surface 38, and the fan 20 not operating when the cam follower 73 is in contact with the cam surface 39.

The cam 47 controls the operation of the switch 80, the switch 80 including a pair of switch springs 81 and 82, the switch spring 82 having associated therewith a cam follower 83 in contact with the cam surfaces of the cam 47, whereby the position of the switch springs 81-82 is controlled by the cam 47. When the cam follower 83 is in contact with the cam surface 48, the switch springs 81 and 82 are open, as illustrated in FIG. 1; and when the cam follower 83 is in contact with the cam surface 49, the switch springs 81 and 82 are closed. The switch spring 82 is connected to the conductor 62 and the switch spring 81 is connected by a conductor 64 to one of the input terminals for the filter structure 100, as will be explained more fully hereinafter, whereby when the switch 80 is closed and the switches 57-58 are closed, the filter structure 100 has operating potential applied thereto; conversely, when the switch 80 is open, the filter structure 100 has no operating potential applied thereto.

The construction of the filter structure 100 will now be described in greater detail with reference additionally to FIGS. 2 to 4 of the drawing. As is best seen in FIG. 2, the filter structure 100 illustrated herein is essentially rectangular and is enclosed in a frame 101 defining the rectangular shape of the filter structure 100 and having a pair of inwardly directed opposed flanges 102 and 103 disposed substantially parallel to each other to hold the various parts of the filter structure in the desired assembled relationship. Fundamentally, the filter structure 100 includes a filter member 110 disposed to the left as viewed in FIG. 1, a batt 120 of glass fibers disposed centrally in FIG. 1, and a perforated metal sheet 130 disposed to the right in FIG. 1; the batt 120 of glass fibers is not self-supporting, whereby the filter member 110 forms a first retainer disposed on one side of the batt 120 and the metal sheet 130 forms a second retainer disposed on the other side of the batt 120, the filter member 110, the batt 120 and the metal sheet 130 all being held in the assembled position by the frame 101, and particularly by the inturned flanges 102 and 103 thereon.

The filter member 110 is more specifically in the form of a woven cloth wherein the woof threads 111 are formed of glass fibers and the warp threads are of two kinds, a first warp thread 112 formed of glass fibers and a second warp thread 113 formed of electrically resistive wire. As illustrated in FIGS. 3 and 4 of the drawing, the woof threads 111 are orientated vertically while the warp threads 112 of glass fiber and the warp threads 113 of wire are arranged horizontally, the warp threads 112 of glass fibers and the warp threads 113 of wire alternating in the cloth that comprises the filter member 110. As a result, the adjacent wires 113 are spaced from each other and therefore electrically insulated from each other, the glass fibers providing good electrical insulation. By reference to FIG. 2, it will be seen that the resistive wires 113 are also spaced inwardly away from the metal frame 101 to be electrically insulated therefrom by the glass fiber threads forming a major portion of the filter medium 110.

As is further diagrammatically illustrated in FIG. 2, the wire warp threads 113 have the ends thereof connected to provide three separate sections in the filter member 110, the three sections being designated respectively S1, S2 and S3, whereby each section S1, S2 and S3 is in fact a single long conductor that is arranged sinuously in the cloth forming the filter member 110. One end of the wire in each of the sections S1, S2 and S3 is connected to a conductor 115 and the other end of the wire in each of the sections S1, S2 and S3 is connected to a conductor 116, thereby to place the elongated wires in the sections S1, S2 and S3 in parallel with each other between the conductors 115 and 116. There further is provided on the frame 101 a pair of terminals T1 and T2 that are insulated from the metal frame 101 respectively by insulators 117 and 118. The conductor 115 is connected to the terminal T1 and the conductor 116 is connected to the terminal T2, thereby to provide terminals for applying operating potentials to the conductors forming a part of the filter member 110. As is illustrated in FIG. 1, one of the main conductors 61 is connected to the terminal T1 and the conductor 64 from the switch 80 is connected to the terminal T2, whereby the cam 47 controls the application of heating potential to the filter member 110, the heater in the filter member 110 being energized when the cam follower 83 on the switch 80 is in contact with the cam surface 49, and the heater in the filter member 110 being de-energized when the cam follower 83 is in contact with the cam surface 48.

The metal sheet 130 includes a body 131 having a plurality of circular openings 132 therein, whereby to provide ample passages for the filtered stream 41 of air issuing from the filter structure 100. In fact the entire assembly comprising the filter structure 100 is porous, the cloth of the filter medium 110 being porous, the batt 120 of glass fiber being porous and the metal sheet 130 being porous due to the presence of the large openings 132 therein. As a consequence, a stream of air from the fan 20 can be readily blown therethrough, the dirt, debris and the like, entrained in the air being preferentially trapped on the filter member 110 which is placed on the upstream side of the filter structure 100. The batt 120 of glass fiber provides in essence a "backup" filter member which is usually not needed if the filter structure 100 is cleaned regularly and if the filtering load imposed thereon is not far in excess of that expected during the normal service thereof.

In the filter structure 100, it will be understood that the threads 111 and 112 of glass fiber provide insulation for the wires 113 to insulate the wires 113 from each other and from the metal frame 101. The glass fibers in the batt 120 also serve to insulate the wires 113 from the metal sheet 130. Not only must the glass fibers of the threads 111 and 112 in the batt 120 be electrically insulating, but they must also be chemically stable at the temperature to which it is desired to heat the heater elements formed of the wires 113, this being typically up to temperatures of 1,000° F. or even slightly higher. Not only do the heating elements comprised of the wires 113 heat the filter member 110, but they also heat the adjacent surface of the batt 120 and any materials entrapped thereon.

In accordance with the present invention, the application of 118 volts A.C. to the terminals T1 and T2 will heat the wires 113 to a temperature in the range of 700° F. to 1,000° F., the preferred temperature being 850° F. It has been found that at this temperature lint, organic dust, and other organic materials entrapped on the filter member 110 are heated to destruction, i.e., the combustible materials entrapped on the filter structure 100 are destroyed by heating to the combustion temperature thereof. In order to obtain the desired destruction of the combustible materials on the filter structure 100, the wires 113 must be in intimate contact with the active filter structure, namely, the glass fiber threads 111 and 112 forming the cloth of the filter member 110, and must be in intimate contact with the adjacent or upstream surface of the batt 120 of glass fibers; this is necessitated by the fact that the glass threads and glass fibers as well as the entrapped materials are fundamentally heat insulators, and therefore the wires 113 are preferably woven into the filter member 110 and are placed directly against the adjacent surface of the batt 120. It will be appreciated that the wires 113 also are filter members, whereby the materials entrapped thereon are also destroyed by heating to the combustion temperatures thereof.

The filtering system of the present invention is best utilized by frequently energizing the heating elements formed by the wires 113 so that the entrapped materials are destroyed before any substantial accumulation thereof is obtained on the filter structure 100. It is for this reason that the timer 30 has been incorporated in the filtering system 10 so that the filter strucutre 100 is automatically cleaned by the application of operating potentials to the heating element therein periodically and frequently. It has further been found that the destruction of the entrapped combustible materials is accomplished more quickly and more thoroughly if the fan 20 is stopped during the cleaning of the filter structure 100; therefore the cams 37 and 47 are arranged so that the filter structure 100 is heat cleaned by the application of heating potentials thereto while the fan 20 is stopped.

In a typical operating cycle of the filtering system 10 of FIG. 1, the switches 57 and 58 are closed so as to apply operating potentials to the fan motor 21 through the switch 70 and also to apply operating potentials to the timer motor 31. The fan 20 operates for a predetermined period of time, such as twenty-four hours, by means of the cam 37 holding the switch 70 closed. At the end of twenty-four hours of operation of the fan 20, the switch 70 is opened by the cam follower 73 contacting the cam surface 39, thereby to stop operation of the fan 20. Simultaneously, the cam follower 83 engages the cam surface 49 to close the switch 80, thus to apply operating potentials to the terminals T1 and T2 of the filter structure 100. The heating elements comprising the wires 113 are heated to a temperature of 850° F. and under the control of the cam 47 the heating is continued for five minutes, as an example, to destroy the accumulated lint and other combustible materials on the structure 100. At the end of the heating cycle, the switch 80 is opened by the cam follower 83 contacting the cam surface 48 and the switch 70 is closed by the cam follower 73 contacting the cam surface 38, whereby to stop the heating of the filter structure 100 and to resume operation of the fan 20. The filtering system 10 automatically cleans the filter structure 100 once each twenty-four hours by heating the wires 113 to a temperature of approximately 850° F.

In a typical example of the filter structure 100, the external dimensions thereof are 9" x 17", and the cloth forming the filter member 110 has substantially the same dimensions. The cloth forming the filter member 110 is woven of fiber glass threads having diameters of approximately 1/16" each consisting of ten or more glass fiber filaments twisted together, these being utilized as the threads 111 and 112. The wire 113 was 24-gauge Nichrome wire having a resistance of 1.67 ohms per foot. In the weaving of the cloth forming the filter member 110, the wires 113 were confined to an area approximately 7" x 15" centrally of the cloth so as to provide an electrically insulating border between the wires 113 and the frame 101. Each of the heating sections S1, S2 and S3 contained approximately forty-five individual wires 113 having the ends thereof interconnected to provide an active length of approximately 15 feet, the ends of the sections being connected to the conductors 115–116. Each such heating section had a resistance of approximately 38 ohms. The wires 113 when energized were heated to a dull red condition which produced a temperature of approximately 850° F. that was found to be suitable for destroying the combustible materials entrapped on the filter structure 100.

In the above preferred example of the filtering system, the fan 20 has been illustrated as being disposed on the upstream side of the filtering structure 100 so as to blow air therethrough; it will be understood that the fan 20 may also be placed on the downstream side of the filtering structure 100, thereby to draw air to be filtered through the filter structure 100. Likewise, although the resistive wires 113 have been shown as warp threads, it will be understood that they may be disposed as woof threads instead of as warp threads and still provide the necessary cleaning action, provided that they are disposed in contact with the filter medium.

From the above it will be seen that there has been provided a filtering system and filter structure therefor which fulfill all of the objects and advantages set forth above. More specifically, there has been provided a filtering system and filter structure which are essentially self-cleaning, thus to eliminate the need for the discard and replacement of the filter structure or the removal and washing and replacement thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A self-cleaning filter structure for filtering air and the like comprising a frame, a body of porous filter medium mounted in said frame and supported thereby, said filter medium being both electrically insulating and chemically stable at temperatures up to about 1,000° F., an electric heating element including an electrically resistive wire in thermal contact with at least one surface of said body of filter medium, and a pair of terminals mounted on said frame and connected to said heating element for supplying electrical energy thereto, said heating element being heatable to a temperature in the range from about 700° F. to about 1,000° F. to clean said filter medium by heating to destruction the combustible materials entrapped thereon.

2. The self-cleaning filter structure set forth in claim 1, wherein said frame is formed of metal and said terminals are electrically insulated therefrom.

3. The self-cleaning filter structure set forth in claim 1, wherein said heating element is in contact with the side of said body of filter medium that is disposed on the upstream side of said filter structure.

4. The self-cleaning filter structure set forth in claim 1, wherein said heating element comprises a plurality of separate resistive wires connected in parallel.

5. The self-cleaning filter structure set forth in claim 1, wherein said filter medium is glass fibers.

6. A self-cleaning filter structure for filtering air and the like comprising a frame, a porous batt of glass fibers disposed in said frame, said glass fibers being both electrically insulating and chemically stable at temperatures up to about 1,000° F., a first porous retainer mounted on said frame on one side of said batt and being chemically stable at temperatures up to about 1,000° F., a second porous retainer mounted on said frame on the other side of said batt and cooperating with said first retainer to hold said batt in the operative position on said frame, the assembly of said batt of glass fibers and said retainers being porous to permit the passage of air therethrough while filtering entrained materials therefrom, said first retainer having incorporated therein a heating element formed of electrically resistive wire in good thermal contact with the adjacent surface of said batt of glass fibers, and a pair of electrical terminals mounted on said frame and connected to the ends of said resistive wire to provide connection to a source of electrical potential therefor, said heating element being heatable to a temperature in the range from about 700° F. to about 1,000° F. to clean said batt of glass fibers by heating to destruction the combustible materials entrapped thereon.

7. The self-cleaning filter structure set forth in claim 6, wherein said first retainer is a cloth woven of glass fiber threads and said resistive wire.

8. A self-cleaning filtering structure for filtering air and the like comprising a metal frame, a porous batt of glass fibers disposed in said frame, said glass fibers being both electrically insulating and chemically stable at temperatures up to about 1,000° F., a first porous retainer mounted on said frame on one side of said batt and including interwoven glass fiber threads and electrically resistive wire, a second porous retainer mounted on said frame on the other side of said batt and cooperating with said first retainer to hold said batt in the operative position on said frame, the assembly of said batt of glass fibers and said retainers being porous to permit the passage of air therethrough while filtering entrained materials therefrom, said resistive wire in said first retainer being electrically insulated from said frame and providing a heating element in good thermal contact with the adjacent surface of said batt of glass fibers, and a pair of electrical terminals mounted on said frame and electrically insulated therefrom and connected to the ends of said resistive wire to provide a source of electrical potential therefor, said resistive wire being heatable to a temperature in the range from about 700° F. to about 1,000° F. to clean said first retainer and said batt of glass fibers by heating to destruction the combustible materials entrapped thereon.

9. The self-cleaning filter structure set forth in claim 8, wherein said first retainer is a cloth woven from glass fiber threads and resistive wire, said resistive wire being disposed in the warp of said cloth.

10. The self-cleaning filter structure set forth in claim 8, wherein said first retainer is a porous cloth having the warp formed of alternate strands of resistive wire and glass fiber threads and having the woof formed of glass fiber threads.

11. The self-cleaning filter structure set forth in claim 10, wherein said resistive wire is arranged in a plurality of sections all connected in parallel to said terminals.

12. A filter system comprising a self-cleaning filter structure including a frame, a body of porous filter medium mounted on said frame and supported thereby, said filter medium being both electrically insulating and chemically stable at temperatures up to about 1,000° F., an electrical heating element including an electrically resistive wire in thermal contact with at least one surface of said body of filtering medium, and a pair of electrically insulated terminals mounted on said frame and connected to said heating element for supplying electrical energy thereto, said heating element being heatable to a temperature in the range from about 700° F. to about 1,000° F. to clean said filter medium by heating to destruction the combustible materials entrapped thereon; means for passing air through said filter structure to remove from the air material entrained therein; and a control circuit for operating said air passing means and for applying electrical energy to said terminals, said control circuit applying electrical energy to said terminals only when said air passing means is not operating.

13. The filtering system set forth in claim 12, wherein said electrical heating element is disposed on the upstream side of said filter structure.

14. The filtering system set forth in claim 12, wherein said air passing means is an electrically operated fan.

15. The filtering system set forth in claim 14, wherein in said control circuit includes a timer operative alternately to operate said air passing means and to supply electrical energy to said heating element.

References Cited
UNITED STATES PATENTS 3,069,785  12/1962  Mitter et al. _____ 55—282 X
3,268,080   8/1966  Eberly _____ 55—428

HARRY B. THORNTON, *Primary Examiner.*